Jan. 24, 1933.   G. I. WORLEY   1,895,241
TRACTOR ATTACHMENT FOR TRUCKS
Original Filed Nov. 29, 1926   3 Sheets-Sheet 3
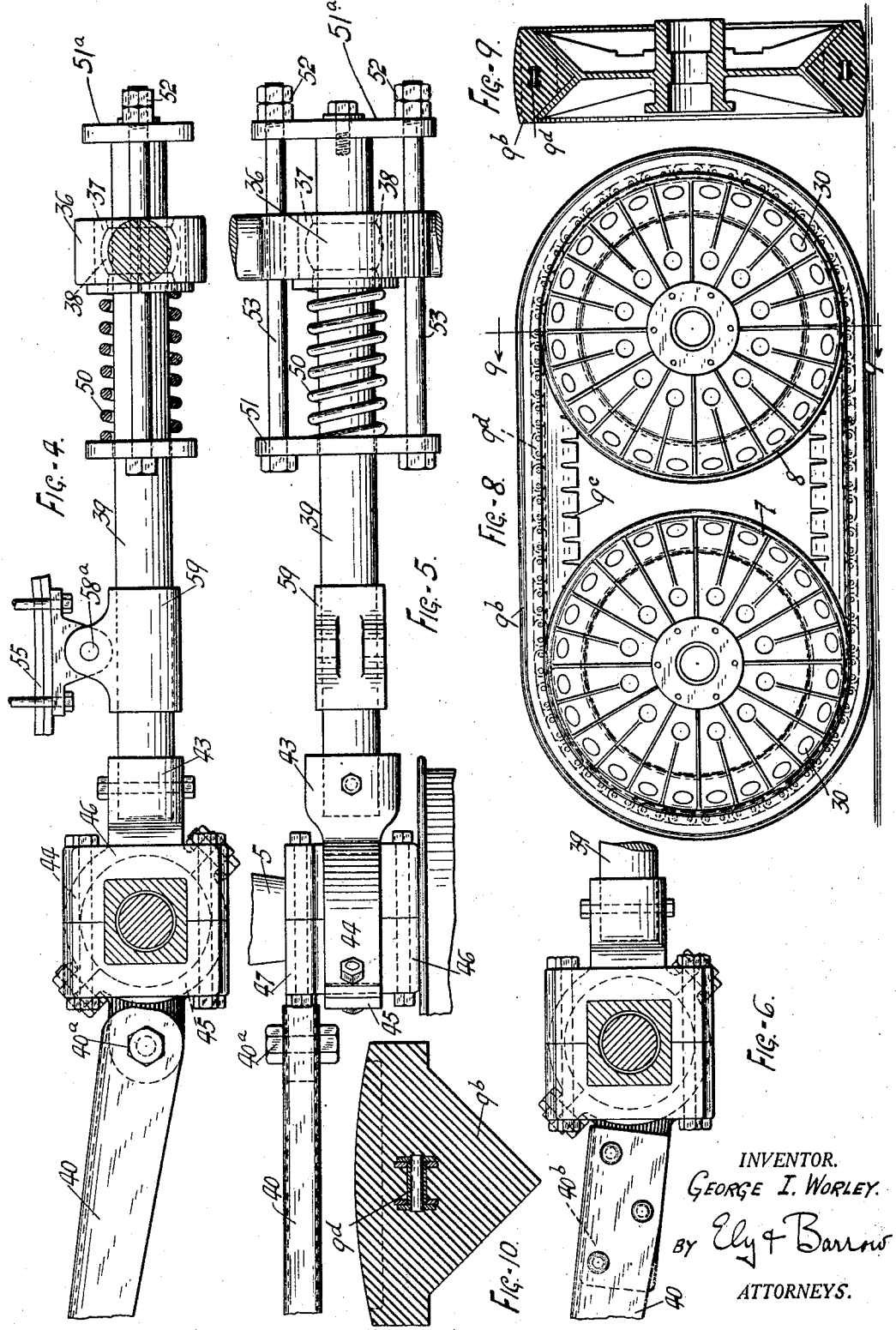
INVENTOR.
GEORGE I. WORLEY.
BY Ely & Barrow
ATTORNEYS.

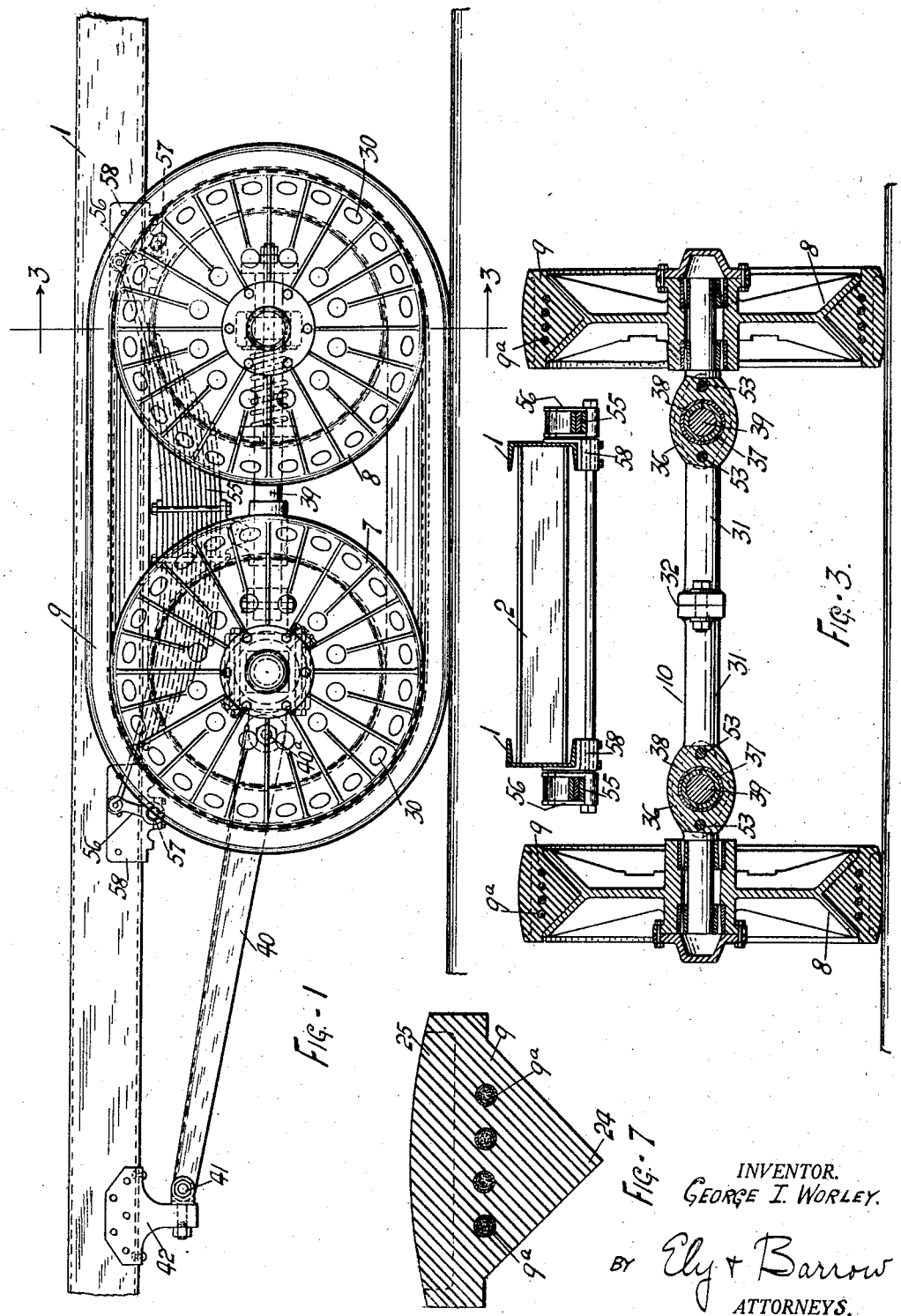

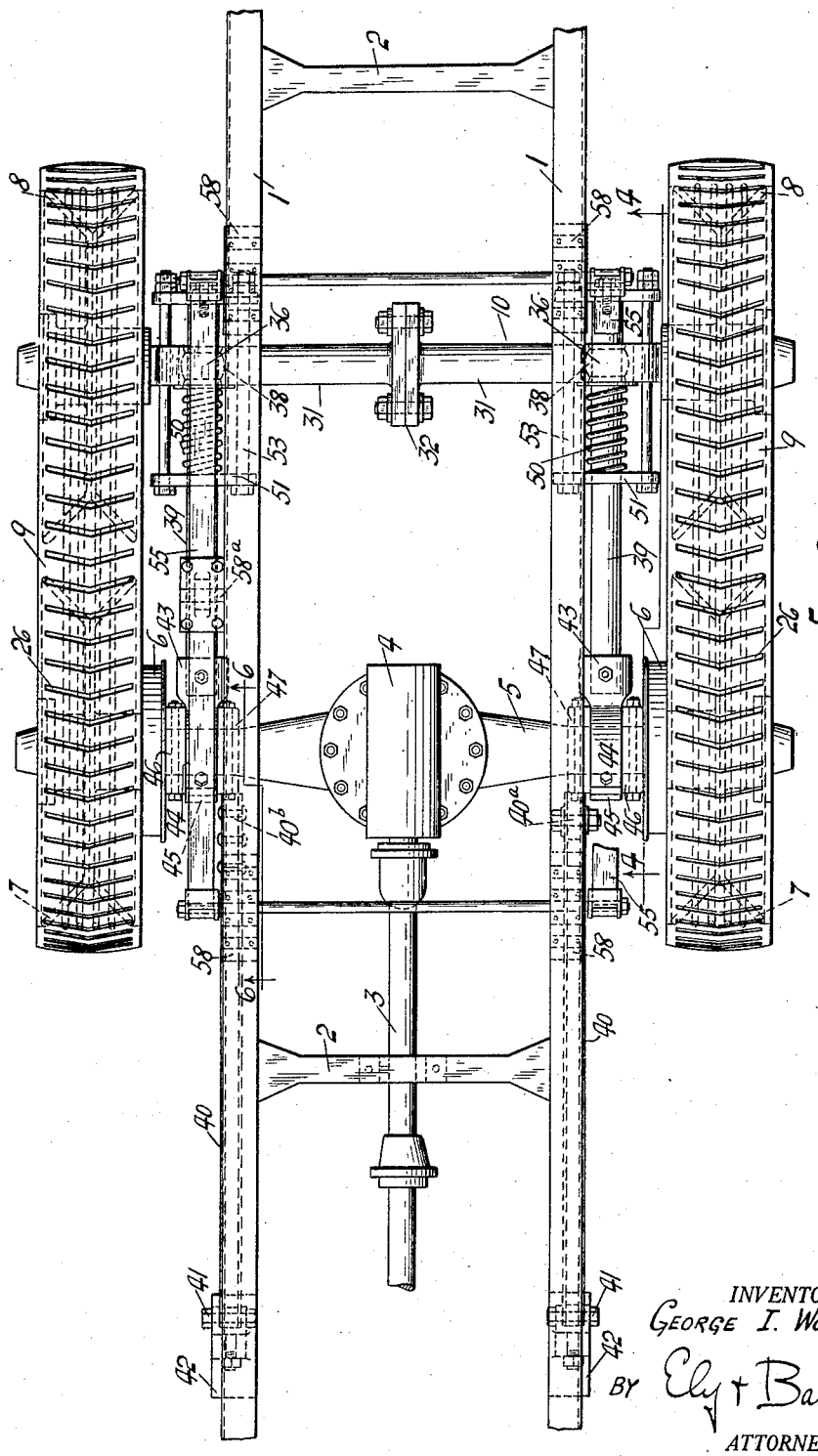

Patented Jan. 24, 1933

1,895,241

UNITED STATES PATENT OFFICE

GEORGE I. WORLEY, OF AKRON, OHIO, ASSIGNOR TO THE McNEIL BOILER COMPANY, OF AKRON, OHIO, A CORPORATION OF OHIO

TRACTOR ATTACHMENT FOR TRUCKS

Application filed November 29, 1926, Serial No. 151,285. Renewed February 5, 1931.

This invention relates to tractor attachments for trucks or other vehicles to adapt them for heavy hauling under all sorts of road conditions. In construction work of all kinds where excavating or filling is being done, the usual forms of wheeled trucks do not operate satisfactorily due to the character of the surfaces over which they are required to run. For example, in excavating for roads, the trucks to haul the dirt from the steam shovels are required to go over the ground which has been excavated and to travel over fields, soft ground, and all kinds and conditions of soil and to climb embankments and hills, and to operate in all weathers and through mud and bogs. The ordinary wheeled truck, such as universally used at the present time, cannot negotiate the roads satisfactorily and are very inefficient.

The purpose of the present invention is to devise a form of tractor attachment for trucks which can be used in place of the wheels and which will operate more efficiently, going over ground in which a wheeled truck cannot travel.

An important object of the present invention is to provide a more efficient and greatly simplified attachment of the above type which is accomplished as will be explained by employing a front-wheel drive tractor instead of the rear-wheel drive devices heretofore employed.

Another object is to provide an improved mounting for the vehicle on the tractor whereby greater flexibility will be secured, enabling the tractor to ride over very uneven surfaces with a maximum of traction thereon and without sacrificing any propelling force thereof.

Another object of the invention is to provide an improved tire for such tractors.

The device shown herein has been used under the most difficult circumstances and has been able to carry heavy loads over roads and through locations which are impassable for wheeled vehicles, and it will be understood that while only one form of the invention is shown and described, other forms may be devised, departing therefrom but still embodying the principles of the invention as set forth herein.

Of the accompanying drawings,

Figure 1 is a side elevation of an attachment embodying the invention;

Figure 2 is a plan thereof;

Figure 3 is a section on line 3—3 of Figure 1;

Figure 4 is a section on line 4—4 of Figure 2;

Figure 5 is a plan of that part of the device shown in Figure 4;

Figure 6 is a section on line 6—6 of Figure 2;

Figure 7 is an enlarged section through the tire shown in the above figures;

Figure 8 is a side elevation illustrating another form of tire;

Figure 9 is a section on line 9—9 of Figure 8; and

Figure 10 is an enlarged, transverse section of the tire shown in Figures 8 and 9.

Referring to the drawings, the framework of the truck body is shown by the parallel beams 1 and the cross members 2. The drive shaft is shown at 3, the differential being indicated at 4 and the usual axle at 5 and the brake drums at 6, all of which are standard construction and are not altered or modified by the attachment of the tractor member.

The tractor attachment comprises two pairs of wheels, each pair comprising a front wheel 7 and a rear wheel 8 over which runs a flexible, elastic tractor belt or tire 9 which runs upon the ground and supports and drives the truck. The front wheels 7 are driven, while the rear wheels, in the construction shown are free to rotate upon the rear of a non-driven axle 10. In this construction the front wheels operate as driving wheels, while the rear wheels may idle.

The outer peripheries of the wheels are formed with grooves, the walls of which converge toward the central plane of the wheel so as to receive the traction belt or tire 9 which is constructed in cross-section substantially triangular, the apex of the triangle being toward the center of the wheel or upon the upper side of that portion of the tire which rests upon the ground. The apex of the tire is indicated at 24 and the ground contacting portion at 25, the latter portion being molded with non-skid projections or formations 26. For the belt or tire, I prefer to use rubber of a tough, resilient structure, such as ordinarily used in the treads of pneumatic tires, and this should be vulcanized as a complete, endless, integral belt without joint so that no weak area may be found therein. The belt 9 preferably has incorporated therein flexible, strain-resisting, reinforcing members comprising rubberized textile material, either fabric or cords, providing cables 9ª, 9ª so that the belt will be capable of long and hard usage.

The triangular construction not only gives better frictional engagement with the grooved surfaces of the wheels, but also serves the highly advantageous function of shedding dirt or sand which would accumulate upon the surface of a flat belt and be compacted and built up between the wheels and the belt. This important advantage is further enhanced by forming a series of apertures or openings 30 in the side flanges of the wheels through which the dirt and sand is discharged. It will also be observed that upon the compression of the belt, the rubber will project into the apertures in the wheels, thereby causing interlocking between the belt and the wheels and preventing slippage between these elements.

The front wheels are mounted directly upon the rear axle 5 of the truck and the rear wheels upon the non-driven or auxiliary axle 10. This secondary axle 10 is composed of members 31 which are clamped together as indicated at 32. The members 31 of the non-driven axle are each formed with an enlarged circular bearing 36 in which is received a split sleeve 37 rotatable with respect to the bearing 36, the sleeve being cored out to provide a spherical bearing 38 in which is slidably received the sub-member 39 which supports the truck body.

The sub-member 39 on each side of the machine extends from the rear of the non-driven axle to a point adjacent the front axle. At the front end of sub-member is pivotally connected to a link 40 on one side of the machine as at 40ª and on the other side is fixedly connected thereto as indicated at 40ᵇ. Each link is connected by the universal joint 41 to the bracket 42 which is attached to the body 1. The link 40 serves as the driving member which propels the truck forward, receiving the thrust of the propelling mechanism through the sub-member. The sub-member is fastened at its front end within a socket 43 formed within the upper half 44 of a two-part yoke, the other half of which is designated as 45. The yoke 44—45 is pivotally mounted upon the front axle 5 between an outer collar 46 and an inner collar 47. The jointed construction of the sub-member and the link 40 on one side and the pivotal and rotative connections at the ends permits a great freedom of movement for the front wheel so that the whole structure can rock about the front axle in going over irregularities in the surface of the ground, and the ball and socket bearings for the rear axle permit of relative movement of the tractor wheels at either side of the truck, and the swiveled connection 41 permits of twisting movement of the tractor unit.

It will be observed that each end of the non-driven axle is slidably mounted upon the sub-member, this construction being for the purpose of permitting a rear wheel to be drawn toward the front wheel by the tractor belt, a provision which is necessary because of the deflection of the belt upwardly between the wheels, as in passing over a rock or other abrupt projection in the ground. The wheels are held apart by means of a heavy coil spring 50 surrounding the sub-member and bearing against the rear axle. The other end of the spring is confined by a cross plate 51 carried on the forward ends of rods 53 located on either side of the sub-member and slidably received in the rear axle. The rear ends of the rods 53 are rigidly connected to the end of the sub-member by means of a second plate 51ª and nuts 52. The spring 50 keeps the traction band under a certain degree of tension and also permits of shortening of its effective length under deflection.

The truck is carried upon springs 55, the shackles 56 of which are fastened in recesses 57 on brackets 58 attached to the frame so that the location of the springs relative to the body can be adjusted. The springs are pivotally supported at 58ª upon sleeves 59 which are slidably mounted upon the sub-member, the arrangement permitting the adjustment of the body upon the traction device relatively to shift the load to the most advantageous position upon the sub-member.

The rolling torque, which tends to turn the whole device upon the front axle, is prevented by the fixed connection at 40ᵇ which resists the rolling torque and yet permits flexibility of the whole structure of the tractor member.

In Figures 8, 9 and 10 the tire 9ᵇ is shown provided with notches 9ᶜ, 9ᶜ on its inner periphery, whereby it will easily flex about the wheels in frictional engagement therewith. In addition the figures illustrate a different form of reinforcement 9ᵈ comprising a flexible chain embedded in the rubber tire.

The apparatus herein shown and described is valuable for contractors who are required to haul through difficult roads and over uneven and slippery ground. The claims are entitled to a full range of equivalents to cover modifications and changes within the scope of the invention.

This application is a continuation of the subject matter of my prior applications Serial No. 602,165, filed November 20, 1922, and Serial No. 33,433, filed May 28, 1925, in so far as the general design and arrangement of the tractor attachment is concerned, and such patentable subject matter as is common to the earlier applications and the present application.

What is claimed is:

1. In a tractor device for trucks or the like, front and rear wheels constituting a pair on either side of the truck, a sub-member, means for supporting said sub-member, upon each pair of wheels, a truck body support normally slidably carried upon each sub-member between the wheels, means providing a pivotal connection from the sub-member to the truck body on one side of the truck, a tractor belt over the wheels, and a torque preventing member connecting the truck body and the sub-member on the other side of the truck.

2. In a tractor device for attachment to trucks, the combination with the truck body of a driven front axle, a non-driven rear axle, wheels upon the axles arranged in pairs on either side of the truck, a flexible tractor belt over the wheels of a pair, and flexible sub-members on either side of the device having rocking support upon the front axle and sliding and rocking support upon the rear axle.

3. A tractor device for trucks or the like comprising a sub-frame beneath the truck, supports for the truck body located midway of the sub-frame, a pair of wheels on each side of the sub-frame, the forward wheels being driving wheels, one wheel of each pair being fixed in its position on the sub-frame, the other wheels being movable on the sub-frame, spring means normally tending to hold said wheels apart, and a flexible belt running over said wheels, the belt being free to flex upwardly between the wheels.

4. A tractor device for trucks or the like comprising a sub-frame beneath the truck, supports for the truck body located midway of the sub-frame, a pair of wheels on each side of the sub-frame, the forward wheels being driving wheels, one wheel of each pair being fixed in its position on the sub-frame, the other wheels being movable on the sub-frame, spring means normally tending to hold said wheels apart, and an endless rubber belt running over said wheels, the belt being free to flex upwardly between the wheels.

5. A tractor device for trucks or the like comprising a sub-frame beneath the truck, said frame having two parallel side members capable of independent movement, a truck body support on the sub-frame, a front driving axle for the truck mounted in the side members, wheels on the ends of the drive shaft, a secondary axle extending transversely of and slidably received on the sub-frame, spring means for yieldingly separating the axles, wheels on the ends of the secondary axle, and a flexible, endless belt trained over a wheel on the driving axle and the secondary axle, the belt being permitted to flex upwardly between the wheels, in conjunction with the approach of the wheels.

6. A tractor device for trucks or the like comprising a sub-frame beneath the truck, said frame having two parallel side members capable of independent movement, a truck body support on the sub-frame, a front driving axle for the truck mounted in the side members, wheels on the ends of the drive shaft, a secondary axle extending transversely of and slidably received on the sub-frame, spring means for yieldingly separating the axles, wheels on the ends of the secondary axle, and a flexible, continuous, rubber belt trained over a wheel on the driving axle and the secondary axle, the belt being permitted to flex upwardly between the wheels, in conjunction with the approach of the wheels.

7. In a tractor construction, a truck body, and a sub-frame beneath the truck body, means slidably mounted on said sub-frame and pivotally connected to said truck body for attaching said frame to said body, said sub-frame being substantially rectangular and formed of parallel sub-members, a front driving axle and a rear axle, the sub-members being capable of independent rocking movement, one of said axles being journalled on the sub-members to permit such movement, springs forcing said axles apart, but permitting approach thereof along either sub-member, wheels on the ends of said axles, and flexible tractor belts over the wheels.

8. In a tractor device for attachment to trucks, the combination with a truck body, of a front driving axle and a rear axle, a sub-member below the truck body pivoted at one end upon the driving axle and adapted to extend through and slidably support the secondary axle, a support for the truck body slidably carried upon the sub-member, a thrust member connected to the truck body and the front driving axle, and wheels carried upon the axles.

9. In a tractor device, a truck body, a driving axle and housing, a secondary axle, sub-members pivotally connected to said driving axle and extending slidably through said secondary axle, yielding means positioning said secondary axle on said sub-members, means connecting said sub-members to said truck body, and a pair of thrust members universally pivoted to said truck body, one of said thrust members being pivotally connected to said driving axle housing and the other being rigidly connected.

10. In a tractor device for attachment to trucks, the combination with a truck body, of a front driving axle, a pair of rearwardly extending sub-members below the truck body pivoted at one end upon the front driving axle, a rear axle slidably and tiltably supported on said sub-members and a pair of thrust members pivotally connected at one end to the truck body and secured at the other to the front axle, driven wheels carried upon the front axle, and additional wheels carried upon the rear axle, and a flexible tractor belt over the wheels upon each side of the tractor.

11. In a tractor device for attachment to trucks, the combination with a truck body, of a front driving axle and a secondary rear axle, a pair of sub-members below the truck body pivoted at one end upon the front driving axle and extending rearwardly therefrom, a universal thrust connection pivoted at one end to the truck body and secured at the other to the driving axle, driven wheels on the driving axle, the secondary axle being slidably and tiltably carried upon the sub-members, wheels carried upon the secondary axle, and flexible tractor belts over the wheels on either side of the device.

12. A tractor device for trucks or the like, comprising two pairs of wheels on each side of the device, the forward wheels being driving wheels, a sub-frame connected to each pair of wheels, a spring support for the vehicle, means slidably carried on the sub-frame between the wheels for pivotally connecting said sub-frame to said spring support, a flexible traction band trained over the wheels, and a spring to separate the wheels whereby the traction belt is maintained under tension and to permit the wheels to approach each other when the belt is flexed upwardly between the wheels.

13. In a combination with a truck frame, a tractor unit comprising a pair of substantially parallel axles, wheels journaled at the ends thereof, spaced sub-members connecting said axles, sleeves adapted to slide on said sub-members, said sleeves being pivotally connected to the frame of the truck.

14. In combination with a truck frame, a tractor unit comprising a pair of parallel axles, wheels journaled at the ends thereof, spaced sub-members connecting said axles, sleeves adapted to slide on said sub-members, said sleeves being pivotally connected to the frame of the truck, and links pivotally connecting one end of the sub-members to the frame.

15. In combination with a truck frame, a tractor unit comprising a pair of substantially parallel axles, wheels journaled at the ends thereof, spaced sub-members connecting said axles, one of said axles being slidably carried on said sub-members and yielding means positioning said slidable axle on said sub-members whereby said axles may have relative movement toward and from each other, sleeves adapted to slide on said sub-members, said sleeves being pivotally connected to the frame of the truck, and links pivotally connecting one end of the sub-members to the frame.

16. In combination with a truck frame, a tractor unit comprising a pair of parallel axles, wheels journaled at the ends thereof, spaced sub-members connecting said axles, one of said axles being slidably carried on said sub-members and yielding means positioning said slidable axle on said sub-members whereby said axles may have relative movement toward and from each other, sleeves adapted to slide on said sub-members, said sleeves being pivotally connected to the frame of the truck through resilient means, and links pivotally connecting one end of the sub-members to the frame.

17. In a truck attachment, a sub-frame beneath the truck body, said sub-frame comprising two parallel sub-members, a driving axle about which the sub-members may rotate, a secondary axle, bearings for the sub-member on the secondary axle, said bearings permitting rotation of the secondary axle in a plane transverse to each sub-member, wheels on said axles, and endless, flexible tractor belts over the wheels.

18. In a truck attachment, a sub-frame beneath the truck body, said sub-frame comprising two parallel sub-members, a driving axle about which the sub-members may rotate, a secondary axle, sliding bearings for supporting the sub-members on the secondary axle, said bearings permitting rotation of the axle in a plane transverse to the sub-members, springs to yieldingly separate the axles, wheels on the axles, and flexible belts over the wheels.

19. In a truck attachment, a sub-frame beneath the truck body, said sub-frame comprising two parallel sub-members, a primary axle about which the sub-members may rotate, a secondary axle, shiftable bearings for the sub-member on the secondary axle, said shiftable bearings permitting the secondary axle to tilt with respect to the primary axle and approach or recede therefrom, yielding means normally urging the secondary axle away from the primary axle, wheels on the axles, and flexible belts over the wheels.

20. In a truck attachment, a sub-frame beneath the truck body, said sub-frame comprising two parallel sub-members, a primary axle about which the sub-members may rotate, a secondary axle, bearings for the sub-member on the secondary axle, said bearings permitting the secondary axle to tilt with respect to the primary axle and to assume an angular position with respect thereto, wheels on the axles, flexible belts over the wheels, and springs to force said axles apart.

21. In a truck attachment, a sub-frame beneath the truck body, said sub-frame comprising two parallel sub-members, a primary axle about which the sub-members may rotate, a secondary axle, and bearings for the sub-members on the secondary axle, said bearings permitting the secondary axle to tilt with respect to the primary axle and with respect to each sub-member.

22. In a truck attachment, a sub-frame beneath the truck body, said sub-frame comprising two parallel sub-members, front and rear axles connected with the sub-members, the connections between one of the axles and sub-members permitting rotation of the said axle relative to each sub-member in a plane transverse to the sub-members, wheels on said axles, and endless, flexible tractor belts over the wheels.

GEORGE I. WORLEY.